(12) United States Patent
Dowaki et al.

(10) Patent No.: US 9,534,180 B2
(45) Date of Patent: Jan. 3, 2017

(54) BIOMASS GASIFIER DEVICE

(71) Applicant: JAPAN BLUE ENERGY CO., LTD., Tokyo (JP)

(72) Inventors: Naoki Dowaki, Tokyo (JP); Kiyoshi Dowaki, Noda (JP); Yasuie Takeda, Tokyo (JP); Hiroshi Ikeda, Tokyo (JP); Kousuke Suda, Tokyo (JP); Fumie Kagaya, Tokyo (JP); Hisashi Kamiuchi, Tokyo (JP); Mitsuo Kameyama, Tokyo (JP)

(73) Assignee: JAPAN BLUE ENERGY CO., LTD., Tokyo (JP)

( * ) Notice: Subject to any disclaimer, the term of this patent is extended or adjusted under 35 U.S.C. 154(b) by 97 days.

(21) Appl. No.: 14/399,403

(22) PCT Filed: May 13, 2013

(86) PCT No.: PCT/JP2013/063288
§ 371 (c)(1),
(2) Date: Nov. 6, 2014

(87) PCT Pub. No.: WO2013/172301
PCT Pub. Date: Nov. 21, 2013

(65) Prior Publication Data
US 2015/0135594 A1    May 21, 2015

(30) Foreign Application Priority Data

May 18, 2012    (JP) .................................. 2012-114116

(51) Int. Cl.
*C10J 3/84* (2006.01)
*C10J 3/12* (2006.01)
(Continued)

(52) U.S. Cl.
CPC .................. *C10J 3/84* (2013.01); *C10B 49/16* (2013.01); *C10B 53/02* (2013.01); *C10J 3/12* (2013.01);
(Continued)

(58) Field of Classification Search
CPC ................................. C10J 3/721; C10K 3/006
See application file for complete search history.

(56) References Cited

U.S. PATENT DOCUMENTS 2,805,188 A * 9/1957 Josenhans .................. C10J 3/20
201/31
5,026,403 A * 6/1991 Michel-Kim .............. C10J 3/02
48/203
(Continued)

FOREIGN PATENT DOCUMENTS

JP    56-500256 A    3/1981
JP    2002-508433 A    3/2002
(Continued)

OTHER PUBLICATIONS

International Search Report dated Jul. 23, 2013, issued in corresponding application No. PCT/JP2013/063288.

*Primary Examiner* — Matthew Merkling
(74) *Attorney, Agent, or Firm* — Westerman, Hattori, Daniels & Adrian, LLP

(57) ABSTRACT

A gasification apparatus can produce hydrogen-containing gas from biomass with high thermal efficiency at low costs without severe trouble caused by tar generated by pyrolyzing the biomass, while maximizing the gasification rate of the tar. The gasification apparatus includes a biomass pyrolyzing zone for heating biomass in a non-oxidizing atmosphere, and a gas reforming zone for heating the resulting pyrolyzed gas in the presence of steam. A plurality of preheated granules and/or lumps is moved from the gas reforming zone to the biomass pyrolyzing zone, the appa-
(Continued)

ratus reforms the gas generated by pyrolyzing the biomass and pyrolyzes the biomass, using the heat of the granules and/or lumps. The biomass pyrolyzing zone and the gas reforming zone is provided in a single vessel, and at least one partitioning plate is provided between the biomass pyrolyzing zone and the gas reforming zone.

10 Claims, 6 Drawing Sheets

(51) Int. Cl.
*C10K 3/00* (2006.01)
*C10B 49/16* (2006.01)
*C10B 53/02* (2006.01)
*C10J 3/56* (2006.01)
*C10J 3/72* (2006.01)

(52) U.S. Cl.
CPC .. *C10J 3/56* (2013.01); *C10J 3/72* (2013.01); *C10K 3/006* (2013.01); *C10J 2200/154* (2013.01); *C10J 2300/092* (2013.01); *C10J 2300/0906* (2013.01); *C10J 2300/0916* (2013.01); *C10J 2300/0976* (2013.01); *C10J 2300/0993* (2013.01); *C10J 2300/1628* (2013.01); *C10J 2300/1807* (2013.01); *C10J 2300/1853* (2013.01); *Y02E 50/14* (2013.01); *Y02P 20/145* (2015.11)

(56) References Cited

U.S. PATENT DOCUMENTS

| | | | |
|---|---|---|---|
| 7,077,878 B1 | 7/2006 | Muhlen et al. | |
| 2004/0060236 A1* | 4/2004 | Yoshikawa | B01J 6/008 48/63 |
| 2005/0247553 A1* | 11/2005 | Ichikawa | C10J 3/66 202/96 |
| 2010/0326087 A1* | 12/2010 | Kawase | C01B 3/52 60/780 |
| 2012/0073198 A1* | 3/2012 | Goel | C10K 3/02 48/87 |
| 2012/0193581 A1* | 8/2012 | Goetsch | C01B 3/50 252/373 |

FOREIGN PATENT DOCUMENTS

| | | |
|---|---|---|
| JP | 2003-510403 A | 3/2003 |
| JP | 2005-060533 A | 3/2005 |
| JP | 2005-146056 A | 6/2005 |
| JP | 2007-169534 A | 7/2007 |
| JP | 2008-037902 A | 2/2008 |
| JP | 2008-128519 A | 6/2008 |
| JP | 4264525 B2 | 5/2009 |
| JP | 2010-126595 A | 6/2010 |
| JP | 2011-068859 A | 4/2011 |
| JP | 2011-068893 A | 4/2011 |
| JP | 2011-144329 A | 7/2011 |
| JP | 2011-231193 A | 11/2011 |
| WO | 2008/029689 A1 | 3/2008 |

\* cited by examiner

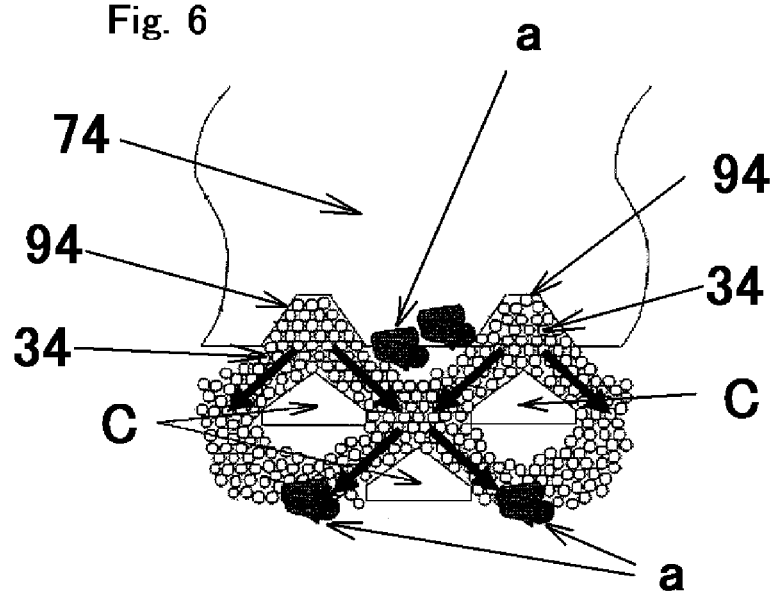

a patent document page

BIOMASS GASIFIER DEVICE

TECHNICAL FIELD

The present invention relates to a biomass gasification apparatus, in particular, a gasification apparatus having a biomass pyrolyzing zone for pyrolyzing biomass and a gas reforming zone for mixing gas generated in the biomass pyrolyzing zone with steam and reforming the mixed gas.

BACKGROUND ART

Since the Great East Japan Earthquake on Mar. 11, 2011, many nuclear power plants have been shut down in terms of the safety. This situation causes a concern about a shortage of power supply, and focuses the interest on alternative renewable energy plants using photovoltaic power generation, wind power generation, geothermal power generation, hydroelectric power generation, tidal power generation, and biomass power generation, instead of nuclear power generation. The photovoltaic power generation, wind power generation, and tidal power generation are expected to be temporary power supplies, but cannot be stable power supplies because of its unstable generation. A small-scale plant of the hydroelectric power generation or tidal power generation is in some demand, whereas a large-scale plant can be built at only limited sites.

The collapse of buildings and forests caused by the Great East Japan Earthquake produced massive woody biomass, such as scrap wood from buildings, fallen trees in forests, timbers remaining in neglected woodlands, and thinnings. Eagerly anticipated is a woody biomass power plant that can effectively utilize such woody biomass. The power plant is also expected to be applied to other biomass than the woody biomass.

A typical woody biomass power plant uses direct combustion power generation or gasification power generation. The direct combustion power generation includes combusting biomass and generating steam with the heat of the combustion, to generate electricity with a steam turbine. The direct combustion power generation can process massive biomass, but the efficiency of the power generation is low. The gasification power generation includes thermally decomposing biomass, and reforming the resulting gas with heat or steam if required, to produce high-calorie gas. The gasification power generation has high efficiency and requires a smaller amount of biomass than that in the direct combustion power generation. Unfortunately, the gasification power generation needs uniform thermal decomposition of biomass and can cause troubles in an apparatus due to the tar generated by the thermal decomposition.

In order to solve the problems in the gasification power generation, for example, Patent Literature 1 (PTL 1) discloses a biomass gasification apparatus including a vertical gasification furnace. Biomass is fed to the upper portion of the gasification furnace to form a moving biomass layer in the gasification furnace, a gasifying agent is fed to the lower portion of the gasification furnace, and the biomass descending in the moving layer is thermally decomposed through the countercurrent contact with the ascending gasifying agent, to produce pyrolyzed gas. The biomass gasification apparatus further includes a vibratory sieve for classifying biomass by size to acquire biomass having an adjusted particle size distribution, which contains biomass particles having a predetermined diameter or smaller at a predetermined weight rate or lower, and a biomass feeder for feeding the biomass having an adjusted particle size distribution from the vibratory sieve to the gasification furnace. The gasification apparatus can ensure uniform upward flow of the high-temperature gas in the moving layer and can reduce the pressure loss in the moving layer, to stabilize the gasification. Unfortunately, the uniform thermal decomposition of the fed biomass is not verified. Furthermore, the necessity of a unit for yielding the biomass having an adjusted particle size distribution leads to an increase in costs.

In order to remove the tar from the pyrolyzed gas, for example, an apparatus for reforming fuel gas in a biomass gasification system (PTL 2) includes a porous heat reservoir, through which fuel gas generated from biomass flows and which is heated to store heat at 1,100° C. or higher, in the flow path of the fuel gas. The system combusts to remove the tar while the fuel gas is passing through the heat reservoir. Unfortunately, the apparatus has a complex configuration and requires complicated manipulation. In addition, part of the fuel gas may also be combusted and lost during the combustion of the tar. Another apparatus for removing the tar from the pyrolyzed gas produced by the thermal decomposition of a biomass material is disclosed in PTL 3, for example. The apparatus includes a compressor for sequentially compressing the pyrolyzed gas from upstream to downstream of the flow of the pyrolyzed gas, and a cooler for cooling the compressed pyrolyzed gas. The apparatus can effectively remove main components, such as furfural, ortho-methoxyphenol, and phenol, of the tar. Unfortunately, the apparatus requires increased facility and operating costs for the compressing and cooling operations. Another pyrolytic gasification system for biomass, such as sewage sludge and woody biomass, is disclosed in PTL 4, for example. The system includes a pyrolytic gasification furnace, a combustion furnace downstream of the pyrolytic gasification furnace, a pipe provided between the pyrolytic gasification furnace and the combustion furnace, an oxidizing agent inlet connected to the pipe to feed an oxidizing agent (mixed gas of inert gas and oxygen) to the pipe, an oxidizing agent adjuster to control the oxygen concentration in the oxidizing agent to 5% to 13% by volume, a heater to heat the inner wall of the pipe, a gas temperature detector to measure the temperature of gas flowing in the pipe, and a gas temperature controller to control the gas temperature. The pyrolytic gasification system can combust to remove the deposits such as tar generated through the thermal decomposition and adhering to the inner wall of the pipe provided between the pyrolytic gasification furnace and the combustion furnace. The system is directed to the quick and safe removal of the pyrolytic deposits derived from biomass. Unfortunately, the system, which combusts the tar generated by the thermal decomposition of the biomass, cannot effectively utilize the tar.

In order to effectively utilize the tar generated by the thermal decomposition of the biomass, for example, a system for reforming woody biomass gas (PTL 5) includes a pyrolytic furnace, a reforming reactor, and an engine. The pyrolytic furnace thermally decomposes introduced woody biomass. The reforming reactor is fed with carbide particles generated by the thermal decomposition in the pyrolytic furnace at the upper portion, and is fed with pyrolyzed gas generated by the thermal decomposition in the pyrolytic furnace at the lower portion, so that the tar vapor contained in the pyrolyzed gas is reformed into hydrogen, methane, and carbon monoxide. The engine is fueled by the reformed gas. The system can effectively utilize the carbide particles (char) remaining after the thermal decomposition. Furthermore, the system reforms the tar with steam into hydrogen, methane, and carbon monoxide, and thus can further improve the gasification efficiency. Unfortunately, the system requires the reforming reactor in addition to the pyrolytic furnace. The system also requires a feeder of carbide particles (char) to the reforming reactor, a circulator of pyrolyzed gas, and feeders of oxygen or air and water. Another biomass carbonizing gas system for effectively utilizing the tar is disclosed in PTL 6, for example. The system thermally decomposes a biomass fuel, such as woody biomass, waste biomass such as urban garbage, and mixed biomass thereof, to carbonize and gasify the biomass fuel. The system includes a carbonizer for heating the biomass fuel to produce carbides, and a two-stage gasification furnace including a high-temperature gasifier for gasifying the carbides and a gas reformer for reforming combustible pyrolyzed gas containing the tar vaporized during the production of the carbides, a carbide feeder for feeding the carbides to the high-temperature gasifier of the gasification furnace, a pyrolyzed gas passage for transferring the combustible pyrolyzed gas generated in the carbonizer to the gas reformer of the gasification furnace, and a gasifying agent feeder. The gasifying agent feeder usually feeds a gasifying agent to the high-temperature gasifier, and feeds a gasifying agent containing oxygen to the gas reformer if the temperature of the exit of the gasification furnace certainly or possibly decreases to a certain level or lower. The system can reduce the amount of generated tar, and can produce high-calorie gas by the reforming operation through the shift reaction. The system can effectively perform the thermal decomposition, the reforming of the pyrolyzed gas, and the decomposition of the tar in sequence. Unfortunately, the system requires the preliminary carbonization of biomass and the feeding of the air for the oxidizing agent, resulting in a decrease in the gasification efficiency.

A typical method of gasifying organic materials such as woody biomass uses heat carriers. For example, PTL 7 discloses a method of producing high-calorie gas from an organic material or organic-material-containing mixture. The heat carriers circulate through a heating zone, a reacting zone, a pyrolyzing zone, a separating zone, and the heating zone again. During the circulation, the organic material or organic-material-containing mixture comes into contact with the heat carriers heated in the pyrolyzing zone and is separated into a carbon-containing residue (solid phase) and pyrolyzed gas (gas phase). After the heat carriers pass through the pyrolyzing zone, the solid carbon-containing residue is separated from the heat carriers through the separating operation. The pyrolyzed gas is mixed with steam serving as a reaction medium, acquires part of the heat of the heat carriers heated in the reacting zone, and thus is further heated, to produce high-calorie gas. The pyrolyzed gas is mixed with steam in the pyrolyzing zone, all the solid carbon-containing residue is transported to another combustion device and is combusted in the combustion device, and hot exhaust gas from the combustion device passes through the heat carriers accumulated in the heating zone such that most of the sensible heat is transferred to the heat carriers. In this method, the mixture is separated into the pyrolytic coke and the heat carriers immediately after exiting a pyrolytic reactor, the resulting pyrolytic coke is combusted in the combustion device, and the sensible heat generated by the combustion is used for heating the heat carriers in the heating zone. The method thus can produce high-calorie gas at low costs. The pyrolytic reactor having the pyrolyzing zone and a gas reforming reactor having the reacting zone are separately provided, so that they can be connected in series or in parallel. In order to stabilize the quality of the pyrolyzed gas while maintaining the thermal efficiency of a preheater for heating the heat carriers in the heating zone, a system (PTL 8) includes a preheater revised from that in the above method. Unfortunately, neither of the method and the system using the heat carriers can sufficiently avoid troubles caused by the tar generated by the thermal decomposition.

CITATION LIST

Patent Literatures

PTL 1: Japanese Unexamined Patent Application Publication No. 2011-231193
PTL 2: Japanese Unexamined Patent Application Publication No. 2005-60533
PTL 3: Japanese Unexamined Patent Application Publication No. 2008-37902
PTL 4: Japanese Unexamined Patent Application Publication No. 2011-68859
PTL 5: Japanese Unexamined Patent Application Publication No. 2010-126595
PTL 6: Japanese Unexamined Patent Application Publication No. 2011-68893
PTL 7: Japanese Patent No. 4264525
PTL 8: Japanese Unexamined Patent Application Publication No. 2011-144329

SUMMARY OF INVENTION

Technical Problem

An object of the invention is to provide an apparatus that can produce hydrogen-containing gas from biomass with high thermal efficiency at low costs without severe trouble caused by the tar and dust generated by pyrolyzing the biomass, while maximizing the gasification rate of the tar.

Solution to Problems

In a typical conventional method of pyrolyzing biomass and reforming the resulting gas with the heat of heat-carrying mediums (heat carriers), the biomass is heated while being enclosed in a layer of the heat carriers. The biomass can thus be relatively uniformly pyrolyzed, but troubles in the operation caused by the tar and dust generated by the pyrolysis (thermal decomposition) cannot be avoided. In the conventional method, the heat carriers are heated to a predetermined temperature in advance, are introduced into a pyrolyzed gas reforming reactor, and are brought into contact with pyrolyzed gas introduced from a biomass pyrolytic reactor and steam, so that the pyrolyzed gas is reformed with steam into a product. The heat carriers descend though the pipe and are introduced into the biomass pyrolytic reactor to cause the pyrolysis of biomass. The gas generated by the pyrolysis of the biomass ascends through the pipe and is introduced into the pyrolyzed gas reforming reactor. Unfortunately, the tar and dust contained in the pyrolyzed gas adhere to the inner wall and valves of the introducing pipe to the pyrolyzed gas reforming reactor, and sometimes adsorb the heat carriers in countercurrent contact with the pyrolyzed gas and clog the pipe. Although the diameter of the introducing pipe can be increased against the problem, the increased diameter can merely prolong the time until the clogging and cannot essentially solve the problem. Against the problem of the clogging of the heat carriers in the pipe, a pipe for the ascending pyrolyzed gas and a pipe for the descending heat carriers can be separately provided. Unfortunately, this measure also cannot avoid the clogging caused by the tar and dust adhering to the inner wall and valves of the pipe for the ascending pyrolyzed gas. Furthermore, the two separate pipes cause significant complication of the apparatus and the manipulation.

In order to solve the problem of the tar and dust adhering to the inner wall and valves of the introducing pipe to the pyrolyzed gas reforming reactor and sometimes adsorbing the heat carriers in countercurrent contact with the pyrolyzed gas and clogging the pipe, the present inventors tried providing a single vessel with both a biomass pyrolyzing zone and a pyrolyzed gas reforming zone without an introducing pipe or valves. The pyrolysis temperature in the biomass pyrolyzing zone at the lower portion of the vessel was designed to be 550° C., whereas the gas reforming temperature in the pyrolyzed gas reforming zone at the upper portion of the vessel was designed to be 950° C., for example. Actually, the temperature inside the vessel was equalized due to the natural convection of the hot air in the vessel. The inventors thus found it difficult to provide a single vessel with both the biomass pyrolyzing zone and the pyrolyzed gas reforming zone. Against this problem, the inventors conceived of the filling of the vessel with heat carriers, which configuration would suppress the natural convection of the hot air in the vessel filled with heat carriers. Unfortunately, it was not easy to introduce biomass into the biomass pyrolyzing zone at the lower portion of the vessel filled with heat carriers. If biomass was introduced into the upper portion of the vessel, the apparatus would merely thermally decompose the biomass and would not reform the pyrolyzed gas, thereby not achieving the original object.

As a result of intensive study to solve the problem, the inventors provided a partitioning plate in the flow path of the heat carriers in the vessel. This configuration can appropriately partition and fill the heat carriers in the upper and lower portions of the vessel, can suppress the natural convection of the hot air in the vessel, can balance the calorific value of the heat carriers with the heat discharge, and can provide a single vessel with both the biomass pyrolyzing zone and the pyrolyzed gas reforming zone. In addition, the partitioning plate allows the upper portion of the biomass pyrolyzing zone to have a space for effectively introducing biomass into the biomass pyrolyzing zone. The inventors thus completed the invention.

Accordingly, the present invention provides:

(1) A gasification apparatus comprising:
 a biomass pyrolyzing zone for heating biomass in a non-oxidizing atmosphere or an atmosphere of mixed gas of non-oxidizing gas and steam, and
 a gas reforming zone for heating gas generated in the biomass pyrolyzing zone, in the presence of steam; and
 a plurality of preheated granules and/or lumps being sequentially moved from the gas reforming zone to the biomass pyrolyzing zone to reform the gas generated by pyrolyzing the biomass and to pyrolyze the biomass, using heat of the granules and/or lumps,
wherein the biomass pyrolyzing zone and the gas reforming zone are comprised in a single vessel,
the gas reforming zone is disposed above the biomass pyrolyzing zone, and
at least one partitioning plate is further comprised between the biomass pyrolyzing zone and the gas reforming zone.

The following aspects are preferred embodiments:

(2) The gasification apparatus according to the aspect (1), the at least one partitioning plate between the biomass pyrolyzing zone and the gas reforming zone includes one or two partitioning plates;

(3) The gasification apparatus according to the aspect (1) or (2), the at least one partitioning plate is disposed in the biomass pyrolyzing zone;

(4) The gasification apparatus according to the aspect (1) or (2), one to five partitioning plates are disposed in the biomass pyrolyzing zone;

(5) The gasification apparatus according to the aspect (1) or (2), one or two partitioning plates are disposed in the biomass pyrolyzing zone 1;

(6) The gasification apparatus according to any one of the aspects (1) to (5), the partitioning plate has openings therein and/or defines a space from the inner wall of the vessel, and the granules and/or lumps sequentially travel from the gas reforming zone to the biomass pyrolyzing zone through the openings and/or space;

(7) The gasification apparatus according to any one of the aspects (1) to (5), the partitioning plate has openings therein, and the granules and/or lumps sequentially travel from the gas reforming zone to the biomass pyrolyzing zone through the openings;

(8) The gasification apparatus according to any one of the aspects (1) to (7), further comprising at least one biomass inlet at the upper portion of the biomass pyrolyzing zone;

(9) The gasification apparatus according to any one of the aspects (1) to (7), further comprising one to five biomass inlets at the upper portion of the biomass pyrolyzing zone;

(10) The gasification apparatus according to any one of the aspects (1) to (7), further comprising one to three biomass inlets at the upper portion of the biomass pyrolyzing zone;

(11) The gasification apparatus according to any one of the aspects (1) to (7), further comprising one or two biomass inlets at the upper portion of the biomass pyrolyzing zone;

(12) The gasification apparatus according to any one of the aspects (1) to (11), further comprising a plurality of staggered flow guides in the biomass pyrolyzing zone, the flow guides being aligned in a plurality of rows along a travelling direction of the granules and/or lumps from the vicinity of exits for the granules and/or lumps in the partitioning plate, the flow guides controlling the travelling direction of the granules and/or lumps, wherein the biomass is fed to the granules and/or lumps traveling in the vicinity of the flow guides and is pyrolyzed;

(13) The gasification apparatus according to any one of the aspects (1) to (11), further comprising a plurality of staggered flow guides in the biomass pyrolyzing zone, the flow guides being aligned in two to five rows along a travelling direction of the granules and/or lumps from the vicinity of exits for the granules and/or lumps in the partitioning plate, the flow guides controlling the travelling direction of the granules and/or lumps, wherein the biomass is fed to the granules and/or lumps traveling in the vicinity of the flow guides and is pyrolyzed;

(14) The gasification apparatus according to any one of the aspects (1) to (11), further comprising a plurality of staggered flow guides in the biomass pyrolyzing zone, the flow guides being aligned in two or three rows along a travelling direction of the granules and/or lumps from the vicinity of exits for the granules and/or lumps in the partitioning plate, the flow guides controlling the travelling direction of the granules and/or lumps, wherein the biomass is fed to the granules and/or lumps traveling in the vicinity of the flow guides and is pyrolyzed;

(15) The gasification apparatus according to any one of the aspects (12) to (14), the biomass is fed to the granules and/or lumps traveling in the vicinity of the uppermost row of the flow guides to be pyrolyzed;

(16) The gasification apparatus according to any one of the aspects (1) to (15), further comprising at least one steam inlet at at least one position selected from the group consisting of a position in the biomass pyrolyzing zone, a position in the gas reforming zone, and a position between the gas reforming zone and the biomass pyrolyzing zone;

(17) The gasification apparatus according to any one of the aspects (1) to (15), further comprising at least one steam inlet in the biomass pyrolyzing zone and/or the gas reforming zone;

(18) The gasification apparatus according to any one of the aspects (1) to (15), further comprising at least one steam inlet in the biomass pyrolyzing zone;

(19) The gasification apparatus according to any one of the aspects (16) to (18), the at least one steam inlet includes two to four steam inlets;

(20) The gasification apparatus according to any one of the aspects (1) to (19), further comprising a preheater at the upper portion of the gas reforming zone of the vessel having the gas reforming zone and the biomass pyrolyzing zone, the preheater heating the granules and/or lumps in advance;

(21) The gasification apparatus according to any one of the aspects (1) to (20), further comprising an outlet for the granules and/or lumps at the lower portion of the biomass pyrolyzing zone of the vessel having the gas reforming zone and the biomass pyrolyzing zone;

(22) The gasification apparatus according to any one of the aspects (1) to (21), the granules and/or lumps are selected from the group consisting of metal spheres and ceramic spheres;

(23) The gasification apparatus according to the aspect (22), the metal spheres are composed of stainless steel;

(24) The gasification apparatus according to the aspect (22), the ceramic spheres are composed of at least one material selected from the group consisting of alumina, silica, silicon carbide, tungsten carbide, zirconia, and silicon nitride;

(25) The gasification apparatus according to any one of the aspects (1) to (24), a gas-phase temperature in the biomass pyrolyzing zone is 400° C. to 700° C.;

(26) The gasification apparatus according to any one of the aspects (1) to (24), a gas-phase temperature in the biomass pyrolyzing zone is 500° C. to 700° C.;

(27) The gasification apparatus according to any one of the aspects (1) to (24), a gas-phase temperature in the biomass pyrolyzing zone is 550° C. to 650° C.;

(28) The gasification apparatus according to any one of the aspects (1) to (27), a gas-phase temperature in the gas reforming zone is 700° C. to 1,000° C.;

(29) The gasification apparatus according to any one of the aspects (1) to (27), a gas-phase temperature in the gas reforming zone is 850° C. to 950° C.;

(30) The gasification apparatus according to any one of the aspects (1) to (27), a gas-phase temperature in the gas reforming zone is 880° C. to 930° C.;

(31) The gasification apparatus according to any one of the aspects (1) to (30), the biomass is selected from the group consisting of plant biomass, biological biomass, domestic waste, and food waste.

Advantageous Effects of Invention

In the apparatus according to the invention, the pyrolyzed gas generated in the pyrolyzing zone does not pass through any pipe when traveling to the gas reforming zone. This configuration can avoid the clogging of the tar and dust accompanied by the pyrolyzed gas in the inner wall and valves of the pipe and the clogging of the heat carriers in the pipe. The apparatus thus can continuously and stably operate for a long period. In addition, the pyrolyzed gas ascends through the interior of the layer of heat carriers, so that the tar and dust accompanied by the pyrolyzed gas can effectively adhere to the surfaces of the heat carriers to be decomposed by the heat of the heat carriers. This configuration can improve the gasification efficiency. Furthermore, the tar and dust remaining undecomposed are discharged from the lower portion of the vessel together with the heat carriers. This configuration can reduce the troubles in the entire apparatus. In addition, the heat carriers do not pass through any pipe between the pyrolyzing zone and the gas reforming zone. This configuration can significantly reduce the loss of heat of the heat carriers, thereby improving the thermal efficiency. The configuration can also reduce the size of the entire apparatus and reduce the amounts of materials of the apparatus, leading to cost reduction.

BRIEF DESCRIPTION OF DRAWINGS

FIG. 6 is a schematic diagram illustrating heat carrier passages provided at the lower side of a cylindrical partitioning plate in the apparatus illustrated in FIG. 5, staggered flow guides aligned in multiple rows along the travelling direction of granules and/or lumps from the vicinity of the exits of the heat carrier passages, and the traveling directions of the granules and/or lumps and biomass in the vicinity of the flow guides.

DESCRIPTION OF EMBODIMENTS

Figure 1:
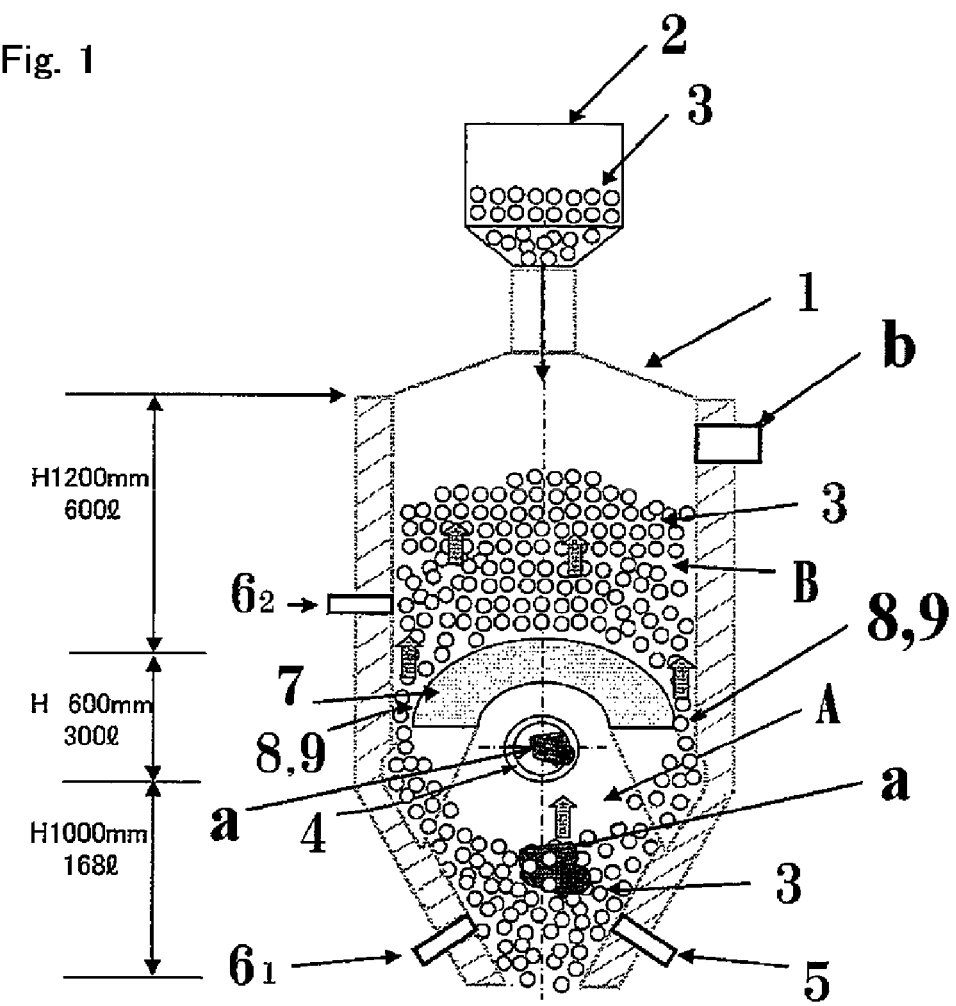
FIG. 1 is a schematic diagram illustrating an apparatus that includes a biomass pyrolyzing zone and a gas reforming zone in a single vessel, according to an embodiment of the invention.
Figure 1:
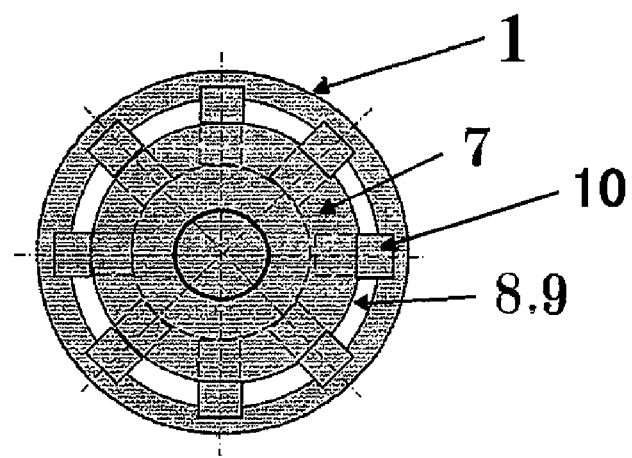

A gasification apparatus according to the invention includes a biomass pyrolyzing zone for heating biomass in a non-oxidizing atmosphere or an atmosphere of mixed gas of non-oxidizing gas and steam, and a gas reforming zone for heating gas generated in the biomass pyrolyzing zone, in the presence of steam, wherein a plurality of preheated granules and/or lumps is sequentially moved from the gas reforming zone to the biomass pyrolyzing zone, and the gas generated by pyrolyzing the biomass is reformed and the biomass is pyrolyzed, using heat of the granules and/or lumps. In the gasification apparatus according to the invention, the biomass pyrolyzing zone and the gas reforming zone are comprised in a single vessel, and the gas reforming zone is disposed above the biomass pyrolyzing zone, such that the granules and/or lumps travel from the gas reforming zone to the biomass pyrolyzing zone by gravity whereas the pyrolyzed gas generated in the biomass pyrolyzing zone spontaneously flows into the gas reforming zone. The apparatus further includes at least one or preferably one or two partitioning plates between the biomass pyrolyzing zone and the gas reforming zone. The partitioning plate separates the biomass pyrolyzing zone from the gas reforming zone.

The partitioning plate between the biomass pyrolyzing zone and the gas reforming zone can limit the space (heat carrier passage) through which the preheated granules and/or lumps can fall from the gas reforming zone to the biomass pyrolyzing zone, and thus can control the speeds of the preheated granules and/or lumps falling from the gas reforming zone to the biomass pyrolyzing zone. The partitioning plate allows the granules and/or lumps to form a layer in each of the gas reforming zone and the biomass pyrolyzing zone. The partitioning plate can maintain the gas reforming temperature in the gas reforming zone and the pyrolysis temperature in the biomass pyrolyzing zone at appropriate levels. The gas generated by pyrolyzing biomass flows through the interior of the layer of the granules and/or lumps. This configuration can facilitate further thermal decomposition of the gas and reaction of the gas with steam, thereby increasing the volume of generated gas. While the gas is flowing through the interior of the layer, the tar and dust adhere to the surfaces of the granules and/or lumps and the adhering tar is thermally decomposed. This configuration can further increase the volume of generated gas. The partitioning plate can define a desired space between the biomass pyrolyzing zone and the gas reforming zone, i.e., in a portion above the biomass pyrolyzing zone and below the gas reforming zone, or a portion below the partitioning plate (a portion on the left of the partitioning plate in the apparatus illustrated in FIG. 3, or a portion below and around the partitioning plate in the apparatus illustrated in FIG. 5). Biomass materials can thus be introduced through the space into the biomass pyrolyzing zone to be thermally decomposed at a predetermined temperature. In addition, the gas generated by the thermal decomposition of the biomass can be sufficiently mixed with steam in the space. Furthermore, the tar and dust generated by pyrolyzing the biomass adhere to the partitioning plate, in particular, the bottom of the partitioning plate, so that part of the adhering tar can react with steam to be gasified. This configuration can sufficiently remove the tar and increase the yield of the reformed gas.

The gasification apparatus according to the invention will now be described with reference to the accompanying drawings. FIG. 1 is a schematic diagram illustrating an apparatus that includes a biomass pyrolyzing zone A and a gas reforming zone B in a single vessel 1, according to an embodiment of the invention. The upper part of FIG. 1 is a schematic side cross-sectional view of the vessel, whereas the lower part is a schematic top view of a partitioning plate in the vessel. A plurality of granules and/or lumps 3, i.e. heat-carrying mediums (heat carriers) is heated in a preheater 2 before being introduced into the gas reforming zone B of the vessel 1. The heat carriers 3 should preferably be heated to 1,000° C. to 1,100° C., more preferably 1,050° C. to 1,100° C. At a temperature below the lower limit, the gas generated by pyrolyzing the biomass sometimes cannot be sufficiently reformed in the gas reforming zone B. At a temperature above the upper limit, the heat carriers merely provide excess heat and cannot provide significantly improved effects, resulting in an increase in costs and a reduction in the thermal efficiency of the apparatus.

The heat carriers 3 heated to the predetermined temperature in the preheater 2 are introduced into the gas reforming zone B disposed at the upper portion of the vessel 1, which has the biomass pyrolyzing zone A and the gas reforming zone B. The pyrolyzed gas, which is generated by the thermal decomposition of biomass in the biomass pyrolyzing zone A at the lower portion of the vessel 1 and ascends in the vessel 1 to be introduced into the gas reforming zone B, is brought into contact with to be heated by the heat carriers 3 in the presence of steam in the gas reforming zone B. The pyrolyzed gas thus reacts with steam to be reformed into hydrogen-rich gas. The steam for reforming the gas is introduced through a steam inlet $6_2$ disposed in the gas reforming zone B or between the gas reforming zone B and the biomass pyrolyzing zone A (in the vicinity of a heat carrier passage 9), and/or a steam inlet $6_1$ disposed in the biomass pyrolyzing zone A. The upper limit of the gas-phase temperature in the gas reforming zone B should preferably be 1,000° C., more preferably be 950° C., even more preferably be 930° C., whereas the lower limit should preferably be 700° C., more preferably be 850° C., even more preferably be 880° C. A gas-phase temperature below the lower limit may inhibit the reforming reaction from proceeding. A gas-phase temperature above the upper limit cannot provide significantly improved effects and increases the calorific value required for heating the heat carriers, resulting in cost increase. At a gas-phase temperature of the more preferred lower limit (850° C.) or higher in the gas reforming zone B, carbon monoxide is significantly reformed with steam. At a gas-phase temperature of the even more preferred lower limit (880° C.) or higher, methane is significantly reformed with steam. In other words, the gas-phase temperature in the gas reforming zone B should preferably be 880° C. or higher to effectively reform both the carbon monoxide and the methane. Although the pyrolyzed gas can be sufficiently reformed at a gas-phase temperature of the more preferred upper limit (950° C.) or lower in the gas reforming zone B, the gas-phase temperature should preferably be 930° C. or lower to reduce the amount of used fuel.

The heat carriers 3 that pass through the gas reforming zone B at the upper portion of the vessel 1 travel through the heat carrier passage 9 (in this case, the space between a partitioning plate 7 and the inner wall of the vessel) in the partitioning plate 7 to the biomass pyrolyzing zone A at the lower portion of the vessel 1. In the biomass pyrolyzing zone A, the heat carriers 3 are brought into contact with biomass a, which is fed through a biomass inlet 4 to the biomass pyrolyzing zone A separately from the heat carriers 3. The biomass pyrolyzing zone A is also fed with non-oxidizing gas such as nitrogen, and steam if required, through a non-oxidizing gas inlet 5 and the steam inlet $6_1$, respectively, to have a non-oxidizing atmosphere or an atmosphere of mixed gas of non-oxidizing gas and steam. The biomass a is thermally decomposed through the contact with the heat carriers 3 to generate pyrolyzed gas. The biomass pyrolyzing zone A in a non-oxidizing atmosphere can prevent the combustion of the biomass a and facilitate efficient thermal decomposition of the biomass a. The resulting pyrolyzed gas ascends in the vessel 1, passes through a pyrolyzed gas passage 8 (identical to the heat carrier passage 9) in the partitioning plate 7, and is introduced into the gas reforming zone B. The upper limit of the gas-phase temperature in the biomass pyrolyzing zone A should preferably be 700° C., more preferably be 650° C.; whereas the lower limit should preferably be 400° C., more preferably be 500° C., even more preferably be 550° C. A gas-phase temperature below the lower limit may inhibit the pyrolysis of biomass. A gas-phase temperature above the upper limit causes heavy tar. Such heavy tar cannot be sufficiently reformed with steam and thus may cause troubles in the apparatus.

Most of the heat required for pyrolysis of the biomass a in the biomass pyrolyzing zone A and reforming the pyrolyzed gas in the gas reforming zone B is supplied by the granules and/or lumps, i.e. heat-carrying mediums (heat carriers) preheated to the predetermined temperature. The introduction of the heat carriers 3 into the vessel 1 and the discharge of the heat carriers 3 from the vessel 1 use, for example, a two-stage valve mechanism (not shown) including two valves disposed at the respective upper and lower portions of a pipe. The manipulation of the two-stage valve mechanism will now be briefly explained. The upper and lower valves are closed in an initial state. The upper valve is opened such that the heat carriers 3 fall in the pipe and stay in the space between the upper and lower valves. The upper valve is then closed whereas the lower valve is opened such that the heat carriers 3 present between the valves are introduced into or discharged from the vessel 1. This manipulation of the valves is repeated, so that the heat carriers 3 are substantially continuously introduced into or discharged from the vessel 1. The introduction and the discharge may be based on any means other than this example. Through the control of the rate of the introduction of the heat carriers 3 into the vessel 1 and the rate of the discharge of the heat carriers 3 from the vessel 1, the heat carriers 3 can form a layer having an appropriate thickness (amount of retention) in each of the biomass pyrolyzing zone A and the gas reforming zone B, and the gas-phase temperatures in the biomass pyrolyzing zone A and the gas reforming zone B can each be controlled within a predetermined range. A significantly high rate of the discharge of the heat carriers 3 from the vessel 1 causes increases in the gas-phase temperatures in the biomass pyrolyzing zone A and the gas reforming zone B. A significantly low rate of the discharge causes a decrease in the gas-phase temperature in the biomass pyrolyzing zone A due to the heat dissipation from the heat carriers. The rates of the introduction and the discharge of the heat carriers 3 into and from the vessel 1 vary depending on the supplied amount, type, water content, and ash content of the material (biomass a). In general, the rates are determined based on the supplied amount of the biomass a. The rates are typically 5 to 60 times by volume the feeding rate of the dry material (dry biomass a) to the vessel 1. The rates should preferably be 5 to 30 times by volume, more preferably be 10 to 20 times by volume the feeding rate of the dry biomass a to the vessel 1. Rates below the lower limit do not allow the heat carriers 3 to provide sufficient calories for thermal decomposition of the biomass a. Rates above the upper limit merely increase the supplied amount of the heat carriers 3, which configuration requires a significantly large vessel 1 and requires extra calories for preheating the heat carriers 3.

The upper limit of the pressure in the vessel 1 should preferably be 104.33 kPa, more preferably be 102.33 kPa; whereas the lower limit should preferably be 100.33 kPa, more preferably be 101.23 kPa. At a pressure above the upper limit, the resulting pyrolyzed gas may flow backward and leak through the biomass inlet 4 to the outside of the vessel 1. At a pressure below the lower limit, the resulting pyrolyzed gas does not pass homogeneously through the layer of the heat carriers 3 in the gas reforming zone B, so that the pyrolyzed gas and the accompanying tar sometimes cannot be sufficiently reformed.

The steam inlet $6_2$ should preferably be disposed in the gas reforming zone B or between the gas reforming zone B and the biomass pyrolyzing zone A, and the steam inlet $6_1$ should preferably be disposed in the biomass pyrolyzing zone A, as described above. In the biomass pyrolyzing zone A, the steam inlet $6_1$ should preferably be disposed at the lower portion of the biomass pyrolyzing zone A. This configuration can effectively heat the steam introduced into the vessel 1 through the contact with the heat carriers 3, can keep the steam in contact with the gas generated by pyrolyzing biomass and the heat carriers 3 for a long time, and thus can efficiently reform the pyrolyzed gas and the tar adhering to the heat carriers. Although the two steam inlets $6_2$ and $6_1$ are respectively disposed at the lower portion of the gas reforming zone B and the lower portion of the biomass pyrolyzing zone A in FIG. 1, any other arrangement can also be employed. Preferably multiple, more preferably two to four, even more preferably four steam inlets should be disposed at each of these lower portions. The temperature of the introduced steam is any temperature, but preferably 130° C. to 200° C., more preferably approximately 160° C. The superheated steam at 500° C. to 600° C. can also be preferably used. For example, upon the introduction of the more preferred steam at approximately 160° C., the supplied weight of the steam should preferably be substantially equal to the supplied weight of the material (biomass).

The biomass inlet 4 only needs to be disposed at a position for effectively feeding the biomass a to the biomass pyrolyzing zone A. The biomass inlet 4 should preferably be disposed at the upper portion of the biomass pyrolyzing zone A, i.e., the space below the partitioning plate 7 and above the layer of the heat carriers 3 retained in the biomass pyrolyzing zone A. This configuration can determine an appropriate time of the contact between the biomass a and the heat carriers 3 to sufficiently t pyrolyze the biomass a. Although FIG. 1 depicts a single biomass inlet 4, any other arrangement can also be employed. Preferably at least one, more preferably one to five, even more preferably one to three, still more preferably one or two biomass inlets 4 should be disposed. Multiple biomass inlets 4 can simultaneously feed different types of biomass through the respective inlets.

The retention time of the biomass a in the biomass pyrolyzing zone A should preferably be 10 to 60 minutes, more preferably 20 to 40 minutes, more preferably 25 to 35 minutes. A retention time below the lower limit does not allow the biomass to be uniformly heated or uniformly pyrolyzed, resulting in a decrease in the volume of the resulting pyrolyzed gas. A retention time above the upper limit cannot provide significantly improved effects, resulting in an increase in costs for the apparatus. The retention time of the biomass a in the biomass pyrolyzing zone A can be appropriately controlled based on the traveling speed of the heat carriers 3 and the supplied amount of the biomass. The retention time of the gas in the gas reforming zone B should preferably be one to ten seconds, more preferably be two to five seconds. The retention time of the gas in the gas reforming zone B can be determined based on the traveling speed and the amount of the loaded heat carriers 3, the supplied volume of the steam, and the volume of the pyrolyzed gas to be generated.

The heat carriers 3, which pass through the gas reforming zone B and then the biomass pyrolyzing zone A as explained above, are discharged through the bottom of the vessel 1 together with a residue of the pyrolysis of biomass (char) and slight amounts of tar and dust that are not pyrolyzed and remain on the heat carriers. The discharge containing the heat carriers 3 can be treated by any known technique, for example, a technique and an apparatus disclosed in PTL 7 or 8. The heat carriers 3 are returned to the preheater 2 and introduced into the vessel 1 again.

The granules and/or lumps, i.e. the heat of heat-carrying mediums (heat carriers) 3 should preferably be composed of at least one material selected from the group consisting of metals and ceramics. The metals include iron, stainless steel, nickel alloy steel, and titanium alloy steel; and stainless steel is most preferred. The ceramics include alumina, silica, silicon carbide, tungsten carbide, zirconia, and silicon nitride; and alumina is most preferred. The granules and/or lumps 3 each should preferably have a spherical or globular shape, but do not need to be spherical and may have an elliptical or oval cross section. The maximum diameter of the granules and/or lumps should preferably be 3 to 25 mm, more preferably be 8 to 15 mm Granules and/or lumps having a diameter above the upper limit have decreased flowability in the vessel 1, i.e., less freely fall, and thus may stay in to clog the vessel 1. Granules and/or lumps having a diameter below the lower limit may be deposited on to clog the vessel 1 due to the tar and dust adhering to the granules and/or lumps. For example, granules and/or lumps having a diameter smaller than 3 mm may be deposited on the inner wall of the vessel 1 due to the tar and dust adhering to the granules and/or lumps, and thus narrow the pyrolyzed gas passage 8 or heat carrier passage 9, leading to the clogging of the passage. When such granules and/or lumps having a diameter smaller than 3 mm are discharged through a valve at the bottom of the vessel 1, the granules and/or lumps, which are light and accompanied with tar, do not freely fall and are deposited on the inside of the valve, leading to clogging.

The biomass in the invention indicates so-called biomass resources. Examples of the biomass resources include plant biomass, e.g., forestry waste, such as thinnings, scrap lumbers, pruned branches, timbers remaining in woodlands, and unused trees, agricultural waste, such as crops (residual vegetables and fruits), and straws and hulls of rice and wheat, seaweeds, and scrap wood from buildings; biological biomass, e.g., biological excretion such as domestic animal excretion and sewage sludge; domestic waste such as garbage; and food waste. The apparatus according to the invention should preferably be suitable for the gasification of plant biomass and biological biomass.

Figure 2:
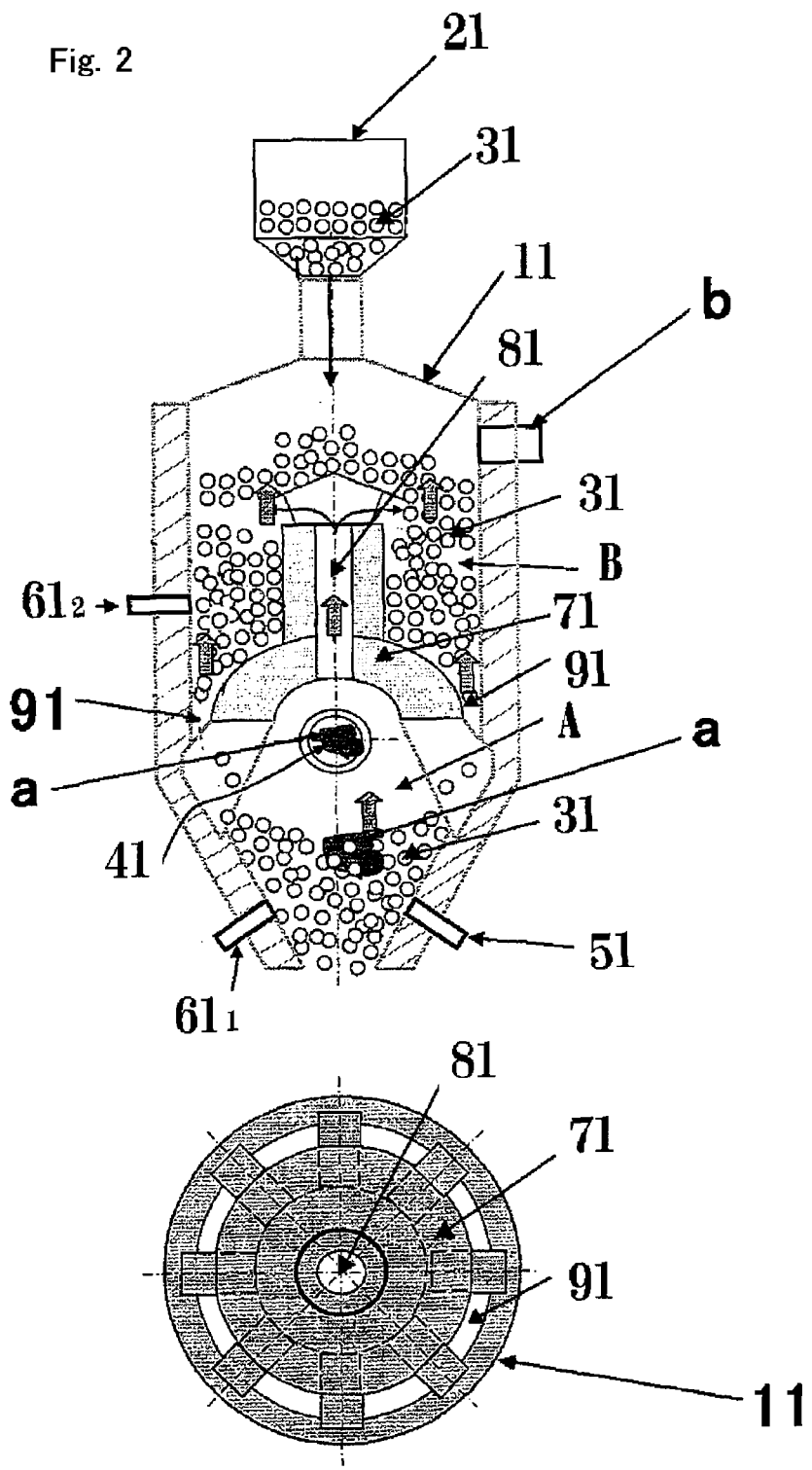
FIG. 2 is a schematic diagram illustrating an apparatus that includes a biomass pyrolyzing zone and a gas reforming zone in a single vessel, according to another embodiment of the invention.

FIG. 2 is a schematic diagram illustrating an apparatus that includes a biomass pyrolyzing zone A and a gas reforming zone B in a single vessel 11, according to another embodiment of the invention. The upper part of FIG. 2 is a schematic side cross-sectional view of the vessel, whereas the lower part is a schematic top view of a partitioning plate in the vessel. A plurality of granules and/or lumps 31, i.e. heat-carrying mediums (heat carriers) is heated to a predetermined temperature in a preheater 21 as in the above embodiment, before being introduced into the gas reforming zone B of the vessel 11. The heat carriers 31 heated to the predetermined temperature in the preheater 21 are introduced into the gas reforming zone B disposed at the upper portion of the vessel 11, which has the biomass pyrolyzing zone A and the gas reforming zone B. The pyrolyzed gas, which is generated by the pyrolysis of biomass a in the biomass pyrolyzing zone A at the lower portion of the vessel 11 and ascends through a pyrolyzed gas passage 81 and a heat carrier passage 91 in a partitioning plate 71 disposed in the vessel 11 to be introduced into the gas reforming zone B, is brought into contact with to be heated by the heat carriers 31 in the presence of steam in the gas reforming zone B. The pyrolyzed gas thus reacts with steam to be reformed into hydrogen-rich gas. The steam for reforming the gas is introduced through a steam inlet $61_2$ disposed in the gas reforming zone B or between the gas reforming zone B and the biomass pyrolyzing zone A (in the vicinity of the heat carrier passage 91), and/or a steam inlet $61_1$ disposed in the biomass pyrolyzing zone A. The gas-phase temperature in the gas reforming zone B is described above. The heat carriers 31 that pass through the gas reforming zone B at the upper portion of the vessel 11 travel through the heat carrier passage 91 (in this case, the space between the partitioning plate 71 and the inner wall of the vessel) in the partitioning plate 71 disposed in the vessel 11 to the biomass pyrolyzing zone A at the lower portion of the vessel 11. In the biomass pyrolyzing zone A, the heat carriers 31 are brought into contact with the biomass a, which is fed through a biomass inlet 41 to the biomass pyrolyzing zone A separately from the heat carriers 31. The biomass pyrolyzing zone A is also fed with non-oxidizing gas such as nitrogen, and steam if required, through a non-oxidizing gas inlet 51 and the steam inlet $61_1$, respectively, to have a non-oxidizing atmosphere or an atmosphere of mixed gas of non-oxidizing gas and steam. The biomass a is thermally decomposed through the contact with the heat carriers 31 to generate pyrolyzed gas. The biomass pyrolyzing zone A in a non-oxidizing atmosphere can prevent the combustion of the biomass a and facilitate efficient thermal decomposition of the biomass a. The resulting pyrolyzed gas ascends in the vessel 11 to be introduced into the gas reforming zone B. The gas-phase temperature in the biomass pyrolyzing zone A is described above. Most of the heat required for thermal decomposition of the biomass a in the biomass pyrolyzing zone A and reformation of the pyrolyzed gas in the gas reforming zone B is supplied by the granules and/or lumps, i.e. heat-carrying mediums (heat carriers) preheated to the predetermined temperature. The introduction and the discharge of the heat carriers 31 into and from the vessel 11 are executed as in the apparatus illustrated in FIG. 1.

Figure 3:
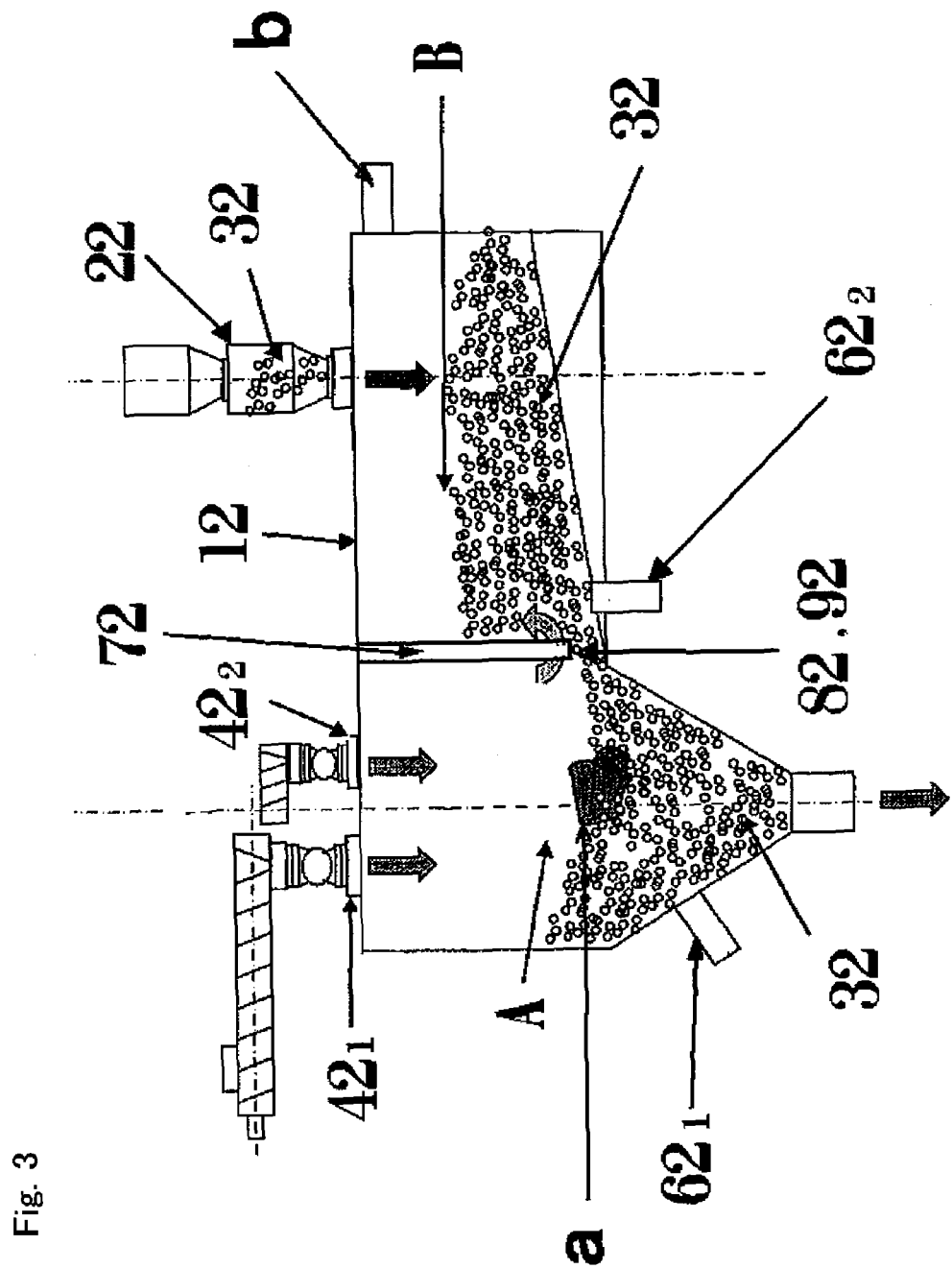
FIG. 3 is a schematic diagram illustrating an apparatus that includes a biomass pyrolyzing zone and a gas reforming zone in a single vessel, according to another embodiment of the invention.

FIG. 3 is a schematic diagram illustrating an apparatus that includes a biomass pyrolyzing zone A and a gas reforming zone B in a single vessel 12, according to another embodiment of the invention. Unlike the apparatuses illustrated in FIGS. 1 and 2, the gas reforming zone B is disposed not directly above the biomass pyrolyzing zone A, but on the upper right of the biomass pyrolyzing zone A via a partitioning plate 72 in a lateral orientation. A plurality of granules and/or lumps 32 forms layers in the respective gas reforming zone B and biomass pyrolyzing zone A on both sides of the partitioning plate 72. The granules and/or lumps, i.e. heat-carrying mediums (heat carriers) 32 are heated to a predetermined temperature in a preheater 22 as in the above embodiment, before being introduced into the gas reforming zone B of the vessel 12. The heat carriers 32 heated to the predetermined temperature in the preheater 22 are introduced into the gas reforming zone B disposed at the upper portion of the vessel 12, which has the biomass pyrolyzing zone A and the gas reforming zone B. The pyrolyzed gas, which is generated by pyrolyzing biomass a in the biomass pyrolyzing zone A at the lower left portion of the vessel 12 and passes through a pyrolyzed gas passage 82 (in this case, the space between the partitioning plate 72 and the inner wall of the vessel) at the lower portion of the partitioning plate 72 disposed in the vessel 12 to be introduced into the gas reforming zone B while ascending through the layer of the heat carriers, is brought into contact with to be heated by the heat carriers 32 in the presence of steam in the gas reforming zone B. The pyrolyzed gas thus reacts with steam to be reformed into hydrogen-rich gas. The steam for reforming the gas is introduced through a steam inlet $62_2$ disposed in the gas reforming zone B or between the gas reforming zone B and the biomass pyrolyzing zone A (in the vicinity of a heat carrier passage 92), and/or a steam inlet 62₁ disposed in the biomass pyrolyzing zone A. The gas-phase temperature in the gas reforming zone B is described above. The heat carriers 32 that pass through the gas reforming zone B at the upper right portion of the vessel 12 travel through the heat carrier passage 92 (identical to the pyrolyzed gas passage 82) at the lower portion of the partitioning plate 72 disposed in the vessel 12 to the biomass pyrolyzing zone A at the lower left portion of the vessel 12. In the biomass pyrolyzing zone A, the heat carriers 32 are brought into contact with the biomass a, which is fed from biomass feeders 42 to the biomass pyrolyzing zone A separately from the heat carriers 32. Non-oxidizing gas such as nitrogen is introduced into the biomass feeders 42 through a non-oxidizing gas inlet (not shown), and is fed to the biomass pyrolyzing zone A together with the biomass a. If required, the biomass pyrolyzing zone A is also fed with steam through the steam inlet 62₁ to have a non-oxidizing atmosphere or an atmosphere of mixed gas of non-oxidizing gas and steam. The biomass a is thermally decomposed through the contact with the heat carriers 32 to generate pyrolyzed gas. The biomass pyrolyzing zone A in a non-oxidizing atmosphere can prevent the combustion of the biomass a and facilitate efficient pyrolysis of the biomass a. The resulting pyrolyzed gas ascends in the vessel 12 to be introduced into the gas reforming zone B. The gas-phase temperature in the biomass pyrolyzing zone A is described above. The apparatus includes two biomass feeders 42 to simultaneously feed two different types of biomass a. Most of the heat required for thermal decomposition of the biomass a in the biomass pyrolyzing zone A and reformation of the pyrolyzed gas in the gas reforming zone B is supplied by the granules and/or lumps, i.e. heat-carrying mediums (heat carriers) 32 preheated to the predetermined temperature. The introduction and the discharge of the heat carriers 32 into and from the vessel 12 are executed as in the apparatus illustrated in FIG. 1.

Figure 4:
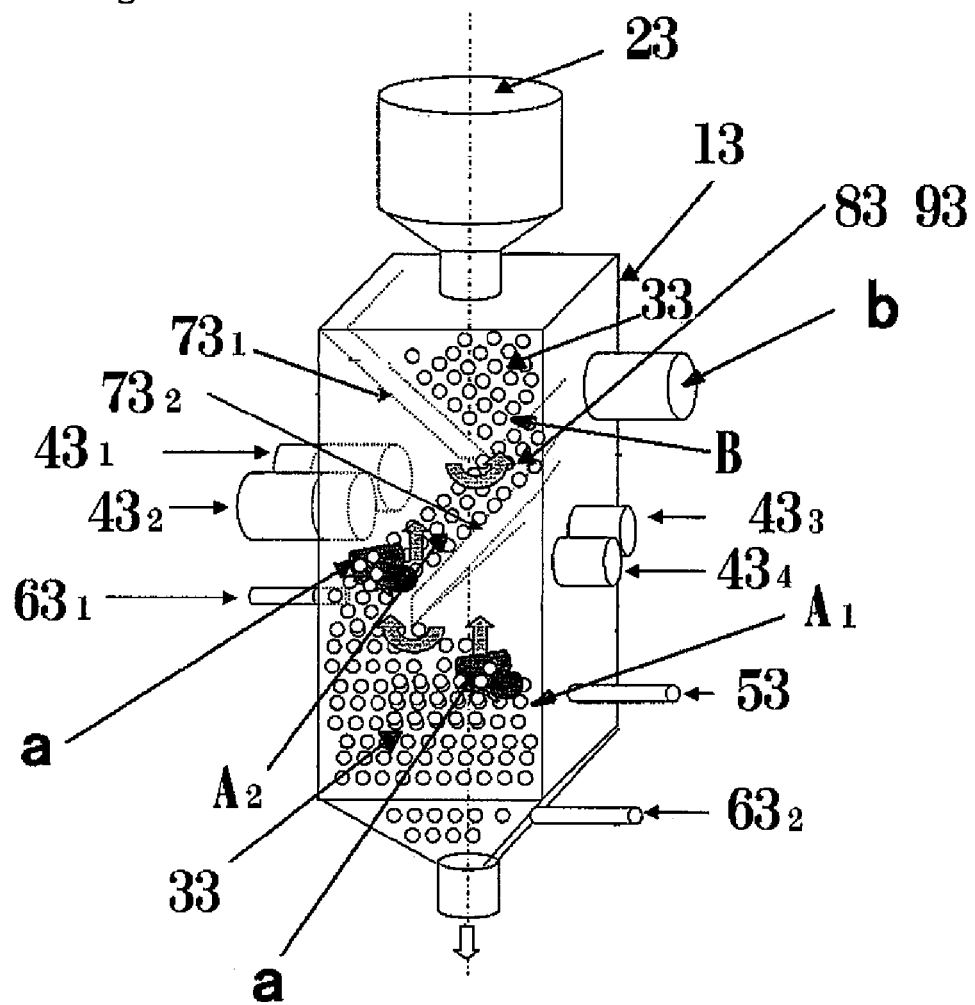
FIG. 4 is a schematic diagram illustrating an apparatus that includes a biomass pyrolyzing zone and a gas reforming zone in a single vessel, according to another embodiment of the invention.

FIG. 4 is a schematic diagram illustrating an apparatus that includes a biomass pyrolyzing zone A and a gas reforming zone B in a single vessel 13, according to another embodiment of the invention. Unlike the apparatuses illustrated in FIGS. 1 and 2, this apparatus includes two partitioning plates 73₁ and 73₂ at a position between the biomass pyrolyzing zone A and the gas reforming zone B and a position in the biomass pyrolyzing zone A, respectively. In the partitioning plates 73₁ and 73₂, the partitioning plate 73₁ disposed at the upper portion of the vessel 13 separates the biomass pyrolyzing zone A from the gas reforming zone B in the vessel 13, whereas the partitioning plate 73₂ disposed at the lower portion of the vessel 13 further divides the biomass pyrolyzing zone A into two subzones $A_1$ and $A_2$. The apparatus further includes four biomass inlets 43₁, 43₂, 43₃, and 43₄ to simultaneously feed different types of materials (biomass). The partitioning plate 73₂ is disposed between two groups of two biomass inlets. This configuration can define two different retention times (times for thermal decomposition) of the biomass in the biomass pyrolyzing zone A, thereby achieving simultaneous feeding of different types of biomass that are thermally decomposed at different rates. Granules and/or lumps 33 are partitioned by the partitioning plate 73₁ into the gas reforming zone B and the biomass pyrolyzing zone A to form a layer in each zone. The partitioning plate 73₂ further divides the biomass pyrolyzing zone A into two subzones. The vessel 13 thus has one gas reforming zone B and two biomass pyrolyzing subzones $A_1$ and $A_2$. The apparatus may include any number of partitioning plates in the gas reforming zone B and/or the biomass pyrolyzing zone A. In other words, the apparatus may include more partitioning plates to further divide the gas reforming zone B and/or the biomass pyrolyzing zone A. The granules and/or lumps, i.e. heat-carrying mediums (heat carriers) 33 are heated to a predetermined temperature in a preheater 23 as in the above embodiment, before being introduced into the gas reforming zone B of the vessel 13. The heat carriers 33 heated to the predetermined temperature in the preheater 23 are introduced into the gas reforming zone B disposed at the upper portion of the vessel 13, which has the biomass pyrolyzing zone A and the gas reforming zone B. The pyrolyzed gas is generated by the thermal decomposition of biomass a in the biomass pyrolyzing subzones $A_1$ and $A_2$ at the lower portion of the vessel 13 and passes through a pyrolyzed gas passage 83 defined by the partitioning plate 73₁ disposed in the vessel 13 to be introduced into the gas reforming zone B while coming into contact with the heat carriers. The pyrolyzed gas and steam are brought into contact with to be heated by the heat carriers 33 in the gas reforming zone B. The pyrolyzed gas thus reacts with the steam to be reformed into hydrogen-rich gas. The steam for reforming the gas is introduced through steam inlets 63₁ and 63₂ respectively disposed in the biomass pyrolyzing subzones $A_2$ and $A_1$. Although both the steam inlets 63₁ and 63₂ are disposed in the biomass pyrolyzing zone in FIG. 4, as described above, the steam inlets 63₁ and 63₂ may be disposed in the gas reforming zone B or between the gas reforming zone B and the biomass pyrolyzing subzone $A_1$ (in the vicinity of a heat carrier passage 93). The gas-phase temperature in the gas reforming zone B is described above. The heat carriers 33 that pass through the gas reforming zone B at the upper portion of the vessel 13 travel through the heat carrier passage 93 (identical to the pyrolyzed gas passage 83), i.e., the space between the partitioning plate 73₁ disposed in the vessel 13 and the inner wall of the vessel, to the biomass pyrolyzing subzone $A_1$ at the lower portion of the vessel 13. In the biomass pyrolyzing subzones $A_1$ and $A_2$, the heat carriers 33 are brought into contact with the biomass, which is fed through the biomass inlets 43₁, 43₂, 43₃, and 43₄ to the biomass pyrolyzing subzones $A_2$ and $A_1$ separately from the heat carriers 33. The biomass subzones $A_1$ and $A_2$ are also fed with non-oxidizing gas such as nitrogen, and steam if required, through a non-oxidizing gas inlet 53 and the steam inlets 63₁ and 63₂, respectively, to have a non-oxidizing atmosphere or an atmosphere of mixed gas of non-oxidizing gas and steam. The biomass a is thermally decomposed through the contact with the heat carriers 33 to generate pyrolyzed gas. The biomass pyrolyzing subzones $A_1$ and $A_2$ in non-oxidizing atmospheres can prevent the combustion of the biomass a and facilitate efficient thermal decomposition of the biomass a. The resulting pyrolyzed gas ascends in the vessel 13 to be introduced into the gas reforming zone B. The gas-phase temperatures in the biomass pyrolyzing subzones $A_1$ and $A_2$ are described above. The gas-phase temperature in the biomass pyrolyzing subzone $A_2$ is equal to or higher than that in the biomass pyrolyzing subzone $A_1$. Most of the heat required for thermal decomposition of the biomass a in the biomass pyrolyzing subzones $A_1$ and $A_2$ and reformation of the pyrolyzed gas in the gas reforming zone B is supplied by the granules and/or lumps, i.e. heat-carrying mediums (heat carriers) 33 preheated to the predetermined temperature. The introduction and the discharge of the heat carriers 33 into and from the vessel 13 are executed as in the apparatus illustrated in FIG. 1.

Figure 5:
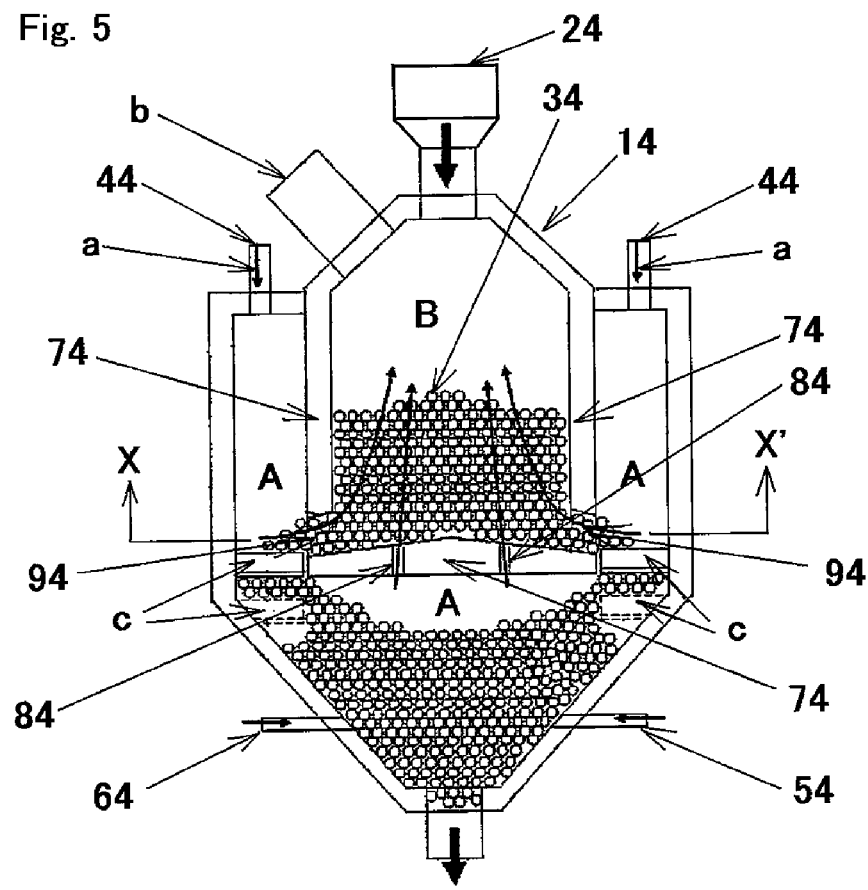
FIG. 5 is a schematic diagram illustrating an apparatus that includes a biomass pyrolyzing zone and a gas reforming zone in a single vessel, according to another embodiment of the invention.
Figure 5:
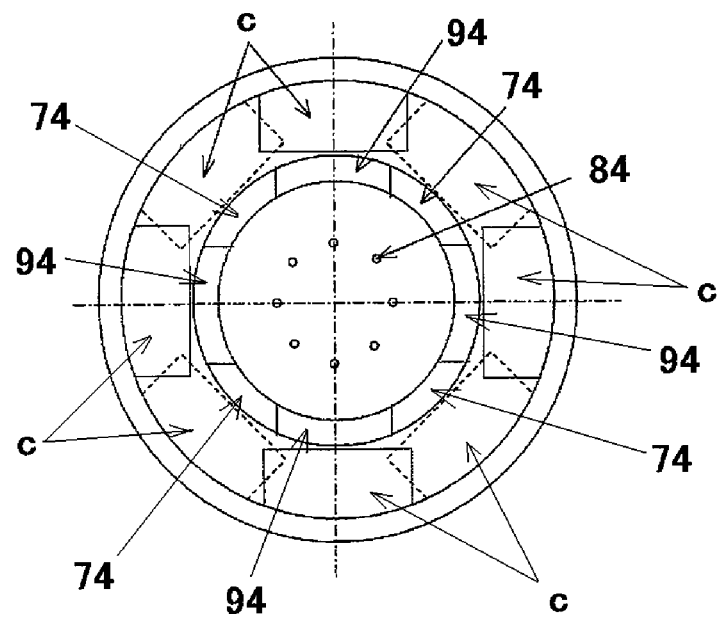

FIG. 5 is a schematic diagram illustrating an apparatus that includes a biomass pyrolyzing zone A and a gas reforming zone B in a single vessel 14, according to another embodiment of the invention. The upper part of FIG. 5 is a schematic side cross-sectional view of the vessel, whereas the lower part is a schematic cross-sectional view along a line X-X' to illustrate the top of a partitioning plate in the vessel. Unlike the apparatuses illustrated in FIGS. 1 and 2, this apparatus includes a cylindrical partitioning plate 74 that separates the biomass pyrolyzing zone A from the gas reforming zone B, in other words, the biomass pyrolyzing zone A surrounds the gas reforming zone B via the cylindrical partitioning plate 74. The cylindrical partitioning plate 74 has four openings (heat carrier passages 94) at the lower side in the circumferential direction. The number and the dimensions of the heat carrier passages 94 should not be limited and can be appropriately determined based on the size of the apparatus, the amount of biomass to be processed, and the diameters of the granules and/or lumps. Granules and/or lumps, i.e. heat-carrying mediums (heat carriers) 34 are heated to a predetermined temperature in a preheater 24 as in the above embodiment, before being introduced into the gas reforming zone B of the vessel 14. The heat carriers 34 heated to the predetermined temperature in the preheater 24 are introduced into the gas reforming zone B disposed at the upper portion of the vessel 14, which has the biomass pyrolyzing zone A and the gas reforming zone B. The pyrolyzed gas, which is generated by the thermal decomposition of biomass a in the biomass pyrolyzing zone A at the lower portion of the vessel 14 and ascends through pyrolyzed gas passages 84 and the heat carrier passages 94 in the cylindrical partitioning plate 74 disposed in the vessel 14 (mainly through the pyrolyzed gas passages 84 in the bottom of the cylindrical partitioning plate 74) to be introduced into the gas reforming zone B, is brought into contact with to be heated by the heat carriers 34 in the presence of steam in the gas reforming zone B. The pyrolyzed gas thus reacts with steam to be reformed into hydrogen-rich gas. The steam for reforming the gas is introduced through a steam inlet 64 disposed in the biomass pyrolyzing zone A. The steam can also be introduced directly into the gas reforming zone B. The gas-phase temperature in the gas reforming zone B is described above.

The heat carriers 34 that pass through the gas reforming zone B at the upper portion of the vessel 14 travel through the heat carrier passages 94, i.e., the openings provided at the lower side of the cylindrical partitioning plate 74 in the vessel 14 in the circumferential direction, to the biomass pyrolyzing zone A at the lower portion of the vessel 14. FIG. 6 is a schematic diagram illustrating the heat carrier passages 94 provided at the lower side of the cylindrical partitioning plate 74 in the apparatus illustrated in FIG. 5, staggered flow guides c aligned in multiple rows along the travelling direction of the granules and/or lumps 34 from the vicinity of the exits of the heat carrier passages 94, and the traveling directions of the granules and/or lumps 34 and the biomass a in the vicinity of the flow guides c. According to this embodiment, the heat carrier passages 94 each have a substantially trapezoidal shape and are provided at the lower side of the cylindrical partitioning plate 74 in the circumferential direction at certain intervals. Each heat carrier passage 94 may have any shape, such as a semicircle or triangle shape, other than the trapezoidal shape. The dimension of the heat carrier passage 94 especially depends on the diameters of the granules and/or lumps 34. The width and height of the heat carrier passage 94 should preferably be at least ten times the diameter of a single particle or bead 34. In the space of the biomass pyrolyzing zone A below the heat carrier passages 94, the staggered flow guides c are aligned in multiple rows, preferably two to five rows, along the travelling direction of the granules and/or lumps 34, i.e., downward from the vicinity of the exits of the heat carrier passages 94. In FIGS. 5 and 6, the staggered flow guides c are aligned in two rows. According to the embodiment, the flow guides c each have a substantially triangle cross section perpendicular to the longitudinal direction of the flow guide c, as illustrated in FIG. 6. It is noted that the flow guide may also have any other cross section provided that the flow guide can appropriately guide the travel of the granules and/or lumps 34 and the biomass a. For example, the flow guide may have a cross section of a circular arc protruding upward. The flow guides c limit the traveling direction of the granules and/or lumps 34, which travel from the heat carrier passages 94 to the biomass pyrolyzing zone A, to form mountain portions and valley portions of the accumulated granules and/or lumps 34 in an alternate manner, as illustrated in FIG. 6.

The material (biomass a) is independently fed mainly to the valley portions of the accumulated granules and/or lumps 34 in the biomass pyrolyzing zone A through biomass inlets 44. The biomass a travels downward in the biomass pyrolyzing zone A while coming into contact with the surrounding granules and/or lumps 34. The biomass pyrolyzing zone A is also fed with non-oxidizing gas such as nitrogen and steam through a non-oxidizing gas inlet 54 and the steam inlet 64, respectively, to have an atmosphere of mixed gas of non-oxidizing gas and steam. The steam does not necessarily need to be introduced into the biomass pyrolyzing zone A. In such a case, the biomass pyrolyzing zone A has a non-oxidizing atmosphere, and the steam is introduced directly into the gas reforming zone B. The biomass a is thermally decomposed through the contact with the granules and/or lumps 34 to generate pyrolyzed gas. The biomass pyrolyzing zone A in a non-oxidizing atmosphere can prevent the combustion of the biomass a and facilitate efficient thermal decomposition of the biomass a. The resulting pyrolyzed gas ascends in the vessel 14 to be introduced into the gas reforming zone B. The gas-phase temperature in the biomass pyrolyzing zone A is described above. Most of the heat required for thermal decomposition of the biomass a in the biomass pyrolyzing zone A and reformation of the pyrolyzed gas in the gas reforming zone B is supplied by the granules and/or lumps, i.e. heat-carrying mediums (heat carriers) 34 preheated to the predetermined temperature. The introduction and the discharge of the heat carriers 34 into and from the vessel 14 are executed as in the apparatus illustrated in FIG. 1.

In the gasification apparatus according to the embodiment of the invention illustrated in FIG. 5, the gas reforming zone B is surrounded by the biomass pyrolyzing zone A. The heat from the gas reforming zone B can thus be used by the thermal decomposition of biomass in the biomass pyrolyzing zone A, thereby increasing the thermal efficiency of the gasification apparatus. In addition, the flow guides c in the biomass pyrolyzing zone A form mountain portions and valley portions of the accumulated granules and/or lumps 34, and the material (biomass a) is fed mainly to the valley portions of the accumulated granules and/or lumps 34. This configuration can facilitate efficient mixing of the biomass a and the granules and/or lumps 34 having different specific gravities, thereby achieving effective thermal decomposition of the biomass a, for example, in the case where the biomass a is composed of wood chips having a specific gravity of 0.2 to 0.3 ton/$m^3$ whereas the granules and/or lumps 34 are composed of alumina having a specific gravity of 3.6 to 3.9 ton/$m^3$.

The invention will now be described in further detail with reference to the examples. The invention should not be limited to the examples.

EXAMPLES

Example 1

The biomass material and the reactor used for thermal decomposition of the biomass material and reformation of gas in Example 1 will now be described.

The used biomass material was scrap wood from buildings, which was coarsely crushed. The coarsely crushed scrap wood contained chopstick-sized rods, thin plates having a size of approximately a quarter of a playing card, and sawdust. The maximum dimension of the scrap wood was approximately 200 to 300 mm Table 1 shows the properties of the scrap wood.

TABLE 1

| CONTENT | ANALYTICAL VALUE |
|---|---|
| MOISTURE (% BY MASS) | 14.3 |
| ASH (% BY MASS) | 0.4 |
| VOLATILE MATTER (% BY MASS) | 85.9 |
| FIXED CARBON (% BY MASS) | 13.7 |

The individual values in Table 1 were measured in accordance with JIS M 8812. The ash, volatile matter, and fixed carbon contents were calculated in dry basis. The moisture was measured when the biomass material had been received.

The vessel 1 illustrated in FIG. 1 was used for thermal decomposition of the biomass material and reformation of gas. The vessel 1 had a biomass pyrolyzing zone A and a gas reforming zone B therein and included a single partitioning plate 7 between these zones. The vessel 1 had an inner diameter of approximately 800 mm, a height of approximately 3,000 mm, and an internal volume of approximately 1 m³. With reference to FIG. 1, the vertical length from the top of the side wall of the vessel 1 to the top of the partitioning plate was 1,200 mm (corresponding volume: 600 L), the vertical length from the top of the partitioning plate to the top of the cone portion of the reactor was 600 mm (corresponding volume: 300 L), and the vertical length of the cone portion was 1,000 mm (corresponding volume: 168 L). An annular pyrolyzed gas passage 8 (heat carrier passage 9), which was defined between the partitioning plate 7 and the inner wall of the vessel 1, had a radial width of 100 mm, and was divided into eight equal segments by eight fasteners 10 each having a length of 100 mm in the circumferential direction of the pyrolyzed gas passage 8 (heat carrier passage 9), as illustrated in FIG. 1. The used heat carriers were substantially alumina spheres having a maximum diameter of 10 to 12 mm. The heat carriers at a temperature of 1,050° C. were introduced into the gas reforming zone B at a rate of 450 kg/h while an appropriate amount of heat carriers being discharged from the biomass pyrolyzing zone A to the outside of the vessel 1, to control the amount of heat carriers accumulated in the gas reforming zone B and the biomass pyrolyzing zone A, such that the gas-phase temperature in the gas reforming zone B was 950° C. and the gas-phase temperature in the biomass pyrolyzing zone A was 550° C. The rate of the extraction of the heat carriers from the biomass pyrolyzing zone A, i.e., the rate of the discharge to the outside of the vessel 1 was 450 kg/h, which was identical to the rate of the introduction into the gas reforming zone B. The extracted heat carriers had a temperature of 600° C. The layers of the accumulated heat carriers respectively occupied approximately 60% by volume of the gas reforming zone B and approximately 60% by volume of the biomass pyrolyzing zone A.

The biomass material (scrap wood from buildings) was continuously fed through a biomass inlet 4 to the biomass pyrolyzing zone A of the vessel 1 with a quantitative feeder at a rate of 25 kg/h. The gas-phase temperature in the biomass pyrolyzing zone A was kept at 550° C. and the pressure in the vessel 1 was kept at 101.3 kPa. The biomass pyrolyzing zone A was also fed with nitrogen gas at a rate of 1,200 L/h through a non-oxidizing gas inlet 5 disposed at the lower portion of the biomass pyrolyzing zone A. The retention time of the biomass material in the biomass pyrolyzing zone A was approximately one hour.

The thermal decomposition in the biomass pyrolyzing zone A generated gas at a rate of 23 kg/h. The gas was then introduced into the gas reforming zone B, which had a gas-phase temperature of 950° C. and a pressure of 101.3 kPa. The vessel 1 was fed with superheated steam (160° C., 0.6 MPa) at a rate of 16 kg/h through a steam inlet $6_2$ disposed at the lower portion of the gas reforming zone B, to reform the gas. The reformed gas at a temperature of 950° C. was yielded from a reformed gas outlet b at a rate of 39 kg/h. The resulting reformed gas was partly collected in a rubber bag and was analyzed with a gas chromatograph GC-14A™ (manufactured by SHIMADZU CORPORATION) to determine the gas composition. Table 2 shows the composition of the resulting reformed gas. The reactor operated continuously for three days. During the operational period, the reactor operated successfully and continuously without trouble, in particular, caused by tar.

TABLE 2

| GAS COMPOSITION (% BY VOLUME; DRY BASIS) | EXAMPLE 1 |
|---|---|
| HYDROGEN | 41.0 |
| CARBON MONOXIDE | 14.5 |
| METHANE | 9.7 |
| CARBON DIOXIDE | 34.8 |

Example 2

Biomass material used in Example 2 was the same as that used in Example 1. The vessel illustrated in FIG. 5 was used for thermal decomposition of the biomass material and reformation of gas. The vessel 14 had a biomass pyrolyzing zone A and a gas reforming zone B therein and included a single cylindrical partitioning plate 74 between these zones. In the vessel 14, the gas reforming zone B had an inner diameter of approximately 800 mm, a height of approximately 1,200 mm, and an internal volume of approximately 0.6 m³. The portion of the biomass pyrolyzing zone A that surrounded the gas reforming zone B had a width of approximately 150 mm, a height of approximately 1,200 mm, and an internal volume of approximately 0.76 m³. The cone portion had a height of approximately 1,000 mm and an internal volume of approximately 0.85 m³. The entire biomass pyrolyzing zone A had an internal volume of approximately 1.61 m³. The cylindrical partitioning plate 74 had four heat carrier passages 94 at the lower side at regular intervals in the circumferential direction. The heat carrier passages 94 each had a substantially trapezoidal shape, which had an upper base length of approximately 100 mm, a lower base length of approximately 360 mm, and a height of approximately 180 mm Staggered flow guides c were aligned in two rows along the traveling direction of the heat carriers 34, i.e., downward from directly below the heat carrier passages 94. The flow guides c each had a substantially triangle cross section perpendicular to the longitudinal direction of the flow guide c. The triangle was a substantially isosceles triangle having a height of approximately 195 mm, a base length of approximately 500 mm, and an approximately 50-mm length of each side perpendicular to the base. The flow guides c in the first row were disposed directly below the respective heat carrier passages 94 in the same number as that of the heat carrier passages 94, whereas the flow guides c in the second row were aligned such that the center of each flow guide c (the vertex of the triangle) in the second row was disposed directly below the midpoint between adjacent two flow guides c in the first row. The line connecting the bases of the flow guides c in the first row had an interval of approximately 60 mm from the line connecting the tops of the flow guides c in the second row. The used heat carriers were substantially alumina spheres having a maximum diameter of 10 to 12 mm. The heat carriers at a temperature of 1,050° C. were introduced into the gas reforming zone B at a rate of 450 kg/h, whereas the same amount of heat carriers at a temperature of 600° C. were discharged from the biomass pyrolyzing zone A to the outside of the vessel 14. The layers of the accumulated heat carriers respectively occupied approximately 60% by volume of the gas reforming zone B and approximately 42% by volume of the biomass pyrolyzing zone A.

The biomass material (scrap wood from buildings) having a water content of 14.3% (wet basis) was continuously fed through biomass inlets 44 to the biomass pyrolyzing zone A of the vessel 14 with a quantitative feeder at a rate of 29 kg/h (dry basis: 25 kg/h). The gas-phase temperature in the biomass pyrolyzing zone A was kept at 700° C. and the pressure in the vessel 14 was kept at 101.3 kPa. The biomass pyrolyzing zone A was also fed with nitrogen gas at a rate of 1,200 L/h through a non-oxidizing gas inlet 54 disposed at the lower portion of the biomass pyrolyzing zone A. The retention time of the biomass material in the biomass pyrolyzing zone A was approximately one hour.

The thermal decomposition in the biomass pyrolyzing zone A generated gas at a rate of 21 kg/h. The gas was then introduced into the gas reforming zone B, which had a gas-phase temperature of 1,000° C. and a pressure of 101.3 kPa. The vessel 14 was fed with superheated steam (230° C., 0.6 MPa) at a rate of 16 kg/h through a steam inlet 64 disposed at the lower portion of the biomass pyrolyzing zone A, to reform the gas. The reformed gas at a temperature of 1,000° C. was yielded from a reformed gas outlet b at a rate of 37 kg/h. The resulting reformed gas was partly collected in a rubber bag and was analyzed with a gas chromatograph GC-14A™ (manufactured by SHIMADZU CORPORATION) to determine the gas composition. Table 3 shows the composition of the resulting reformed gas. The reactor operated continuously for three days. During the operational period, the reactor operated successfully and continuously without trouble, in particular, caused by tar.

TABLE 3

| GAS COMPOSITION (% BY VOLUME; DRY BASIS) | EXAMPLE 2 |
| --- | --- |
| HYDROGEN | 51.8 |
| CARBON MONOXIDE | 17.8 |

TABLE 3-continued

| GAS COMPOSITION (% BY VOLUME; DRY BASIS) | EXAMPLE 2 |
| --- | --- |
| METHANE | 6.2 |
| CARBON DIOXIDE | 24.2 |

Comparative Example 1

A conventional apparatus illustrated in FIG. 1 of PTL 7 was used. The apparatus separately included a pyrolytic reactor having a biomass pyrolyzing zone and a gas reforming reactor having a gas reforming zone.

The gas reforming reactor was connected in series to the top of the pyrolytic reactor with a pipe including a gate valve. The pyrolytic reactor and the gas reforming reactor had internal volumes of approximately 170 L and approximately 600 L, respectively. The heat carriers were moved from the gas reforming reactor to the pyrolytic reactor through the pipe including the gate valve. The same scrap wood from buildings as in the Example 1 was continuously introduced to the pyrolytic reactor with a quantitative feeder at the same rate of 25 kg/h as in Example 1. The rate of the introduction of the heat carriers into the gas reforming zone, the temperature of the heat carriers, and the other operational conditions were the same as those in Example 1. The reformed gas at a temperature of 950° C. was yielded at a rate of 15 kg/h. The resulting reformed gas was partly collected in a rubber bag and was analyzed with a gas chromatograph GC-14A™ (manufactured by SHIMADZU CORPORATION) to determine the gas composition. Table 4 shows the composition of the resulting reformed gas. The apparatus operated continuously for three days as in Example 1. Unfortunately, the inspection of the interior of the pipe including the gate valve, which connects the pyrolytic reactor to the gas reforming reactor, after the operational period revealed that large amounts of tar and dust adhered especially to the gate valve and its vicinity. It was thus difficult to continuously operate the apparatus for a further period. A further operation would require the cleaning of the gate valve and its vicinity, the replacement of the gate valve, or the installation of a bypass pipe for introducing the pyrolyzed gas into the gas reforming reactor in addition to the pipe including the gate valve, which connects the pyrolytic reactor to the gas reforming reactor.

TABLE 4

| GAS COMPOSITION (% BY VOLUME; DRY BASIS) | COMPARATIVE EXAMPLE 1 |
| --- | --- |
| HYDROGEN | 35.9 |
| CARBON MONOXIDE | 31.5 |
| METHANE | 10.3 |
| CARBON DIOXIDE | 22.3 |

The comparison of Examples 1 and 2 and Comparative Example 1 revealed that each of the reactors in Example 1 (39 kg/h) and Example 2 (37 kg/h) produced reformed gas at least two times that in the apparatus in Comparative Example 1 (15 kg/h). With reference to Tables 2 to 4 showing the composition of each reformed gas, each of the reactors in Examples 1 and 2 produced reformed gas having a significantly higher hydrogen content than that in the apparatus in Comparative Example 1. In addition, the reactor in Example 2 produced reformed gas having significantly higher hydrogen and carbon monoxide contents and a significantly lower carbon dioxide content compared to the reactor in Example 1.

INDUSTRIAL APPLICABILITY

The gasification apparatus according to the invention can stably operate for a long period with improved gasification efficiency and improved thermal efficiency at lower costs. The gasification apparatus according to the invention thus can greatly contribute to the gasification of biomass in future. Furthermore, the gasification apparatus can also be applied to the hydrogen production and the power generation.

REFERENCE SIGNS LIST

A, $A_1$, $A_2$ biomass pyrolyzing zone
B gas reforming zone
a biomass material
b reformed gas outlet
c flow guide
1, 11, 12, 13, 14 vessel
2, 21, 22, 23, 24 preheater
3, 31, 32, 33, 34 granule and/or lump (heat carrier)
4, 41, 42, $43_1$, $43_2$, $43_3$, $43_4$, 44 biomass inlet
5, 51, 52, 53, 54 non-oxidizing gas inlet
$6_1$, $6_2$, $61_1$, $61_2$, $62_1$, $62_2$, $63_1$, $63_2$, 64 steam inlet
7, 71, 72, $73_1$, $73_2$, 74 partitioning plate
8, 81, 82, 83, 84 pyrolyzed gas passage
9, 91, 92, 93, 94 heat carrier passage
10 fastener

The invention claimed is:

1. A gasification apparatus comprising:
a biomass pyrolyzing zone for heating biomass in a non-oxidizing atmosphere or an atmosphere of mixed gas of non-oxidizing gas and steam;
a gas reforming zone for heating gas generated in the biomass pyrolyzing zone, in the presence of steam;
a plurality of preheated granules and/or lumps being sequentially moved from the gas reforming zone to the biomass pyrolyzing zone to reform the gas generated by pyrolyzing the biomass and to pyrolyze the biomass, using heat of the granules and/or lumps; and
a plurality of staggered flow guides in the biomass pyrolyzing zone, the flow guides being aligned in a plurality of rows along a travelling direction of the granules and/or lumps from the vicinity of exits for the granules and/or lumps in the partitioning plate, the flow guides controlling the travelling direction of the granules and/or lumps,
wherein the biomass pyrolyzing zone and the gas reforming zone are comprised in a single vessel,
the gas reforming zone is disposed above the biomass pyrolyzing zone,
at least one partitioning plate is further comprised between the biomass pyrolyzing zone and the gas reforming zone, and
the biomass is fed to the granules and/or lumps traveling in the vicinity of the flow guides and is pyrolyzed.

2. The gasification apparatus according to claim 1, wherein the at least one partitioning plate between the biomass pyrolyzing zone and the gas reforming zone comprises one or two partitioning plates.

3. The gasification apparatus according to claim 1, wherein
the partitioning plate has openings therein and/or defines a space from the inner wall of the vessel, and
the granules and/or lumps sequentially travel from the gas reforming zone to the biomass pyrolyzing zone through the openings and/or space.

4. The gasification apparatus according to claim 1, further comprising at least one biomass inlet at the upper portion of the biomass pyrolyzing zone.

5. The gasification apparatus according to claim 1, further comprising a plurality of flow guides, the flow guides being aligned in two to five rows, the flow guides controlling the travelling direction of the granules and/or lumps.

6. The gasification apparatus according to claim 1, further comprising a plurality of flow guides, the flow guides being aligned in two to five rows, the flow guides controlling the travelling direction of the granules and/or lumps, wherein
the biomass is fed to the granules and/or lumps traveling in the vicinity of the uppermost row of the flow guides and is pyrolyzed.

7. The gasification apparatus according to claim 1, further comprising a steam inlet in the biomass pyrolyzing zone and/or the gas reforming zone.

8. The gasification apparatus according to claim 1, further comprising a preheater at the upper portion of the gas reforming zone of the vessel comprising the gas reforming zone and the biomass pyrolyzing zone, the preheater heating the granules and/or lumps in advance.

9. The gasification apparatus according to claim 1, wherein the granules and/or lumps are selected from the group consisting of metal spheres and ceramic spheres.

10. The gasification apparatus according to claim 1, wherein the biomass is selected from the group consisting of plant biomass, biological biomass, domestic waste, and food waste.

* * * * *